United States Patent [19]

Lochner

[11] 4,452,437

[45] * Jun. 5, 1984

[54] HYDRAULIC-OPERATING SHOCK AND VIBRATION ABSORBER AND DAMPER

[76] Inventor: Kaspar Lochner, Karlsburgerstr. 61, München, Fed. Rep. of Germany

[*] Notice: The portion of the term of this patent subsequent to Feb. 17, 1998 has been disclaimed.

[21] Appl. No.: 255,855

[22] Filed: Apr. 20, 1981

[51] Int. Cl.³ .................. F16F 9/342; C10M 5/02
[52] U.S. Cl. .................. 267/64.22; 188/289; 188/322.19; 252/29
[58] Field of Search .......... 188/268, 285, 289, 322.19; 267/64.22, 8 A, 64.13, 64.15; 252/29, 62; 213/223

[56] References Cited

U.S. PATENT DOCUMENTS

| | | | |
|---|---|---|---|
| 2,877,182 | 3/1959 | May ............................. | 252/29 |
| 2,932,576 | 4/1960 | Vierk et al. .................... | 252/29 |
| 2,946,749 | 7/1960 | Sproule et al. ................. | 252/29 |
| 2,963,175 | 12/1960 | Thornhill ....................... | 213/223 |
| 2,994,442 | 8/1961 | Frederick ....................... | 267/64.22 |
| 3,083,163 | 3/1963 | Perrus ............................ | 252/29 |
| 3,518,192 | 6/1970 | Cairns et al. .................. | 252/29 |
| 3,537,997 | 11/1970 | Wright .......................... | 252/29 |
| 3,967,968 | 7/1976 | Stone et al. ................... | 252/29 |
| 3,969,233 | 7/1976 | Lucas ............................ | 252/29 |
| 4,054,311 | 10/1977 | Gute .............................. | 267/64.22 |
| 4,115,284 | 9/1978 | Kinoshita et al. .............. | 252/29 |
| 4,134,844 | 1/1979 | DeVries et al. ................ | 252/29 |
| 4,206,061 | 6/1980 | Dodson et al. ................ | 252/29 |
| 4,251,381 | 2/1981 | Lochner ......................... | 252/62 |

FOREIGN PATENT DOCUMENTS

| | | | |
|---|---|---|---|
| 2016192 | 10/1971 | Fed. Rep. of Germany ... | 267/64.15 |
| 2310237 | 9/1973 | Fed. Rep. of Germany ...... | 188/289 |
| 2324402 | 11/1973 | Fed. Rep. of Germany . | |
| 2412946 | 9/1974 | Fed. Rep. of Germany . | |
| 2438180 | 3/1975 | Fed. Rep. of Germany . | |
| 2,905,046 | 8/1979 | Fed. Rep. of Germany ........ | 252/29 |
| 808931 | 2/1959 | United Kingdom ............... | 213/223 |

OTHER PUBLICATIONS

Ellis et al., "Hydraulic Shock Absorbers", *Machine Design*, 5/1962, pp. 150–157.

*Primary Examiner*—Douglas C. Butler
*Assistant Examiner*—R. R. Diefendorf
*Attorney, Agent, or Firm*—Armstrong, Nikaido, Marmelstein & Kubovcik

[57] ABSTRACT

The invention relates to a hydraulically-operating shock and vibration absorber or damper, having a cylinder closed at one end, a piston slidable within the cylinder, the piston being connected with a hollow piston rod extending out of the open end of the cylinder. The interior of the piston rod and the cylinder define a chamber filled with an incompressible damping fluid. A space is defined in the piston rod separated from the chamber by a slidable separating piston. The space contains a compressible agent. The damping fluid is pressed out of one portion the chamber, through the control port, into another portion when the shock absorber is under load. The compressible damping agent is air or gas under normal pressure or else pressurized. The imcompressible damping fluid consists of a non-Newtonian, permanently plastic, homogeneous paste of high heat-conducting capacity composed of graphite, a wetting agent, intrinsically viscous agent and polyglycol ether, polyglycol ester and/or a saturated, aromatic or aliphatic ester of caboxylic acid. Into the opening of the piston, a control pin extends which increases or decreases the cross section of the opening when the piston moves in and out.

20 Claims, 9 Drawing Figures

HYDRAULIC-OPERATING SHOCK AND VIBRATION ABSORBER AND DAMPER

BACKGROUND OF THE INVENTION

The invention relates to a hydraulically-operating shock and vibration absorber or damper, having a cylinder closed at one end, and a piston which is slidable within the cylinder. The piston is provided with a port and is connected with a hollow piston rod that extends out of the open end of the cylinder. The interior of the cylinder and the piston rod define a chamber filled with a incompressible damping fluid. A space is defined in the piston rod separated from said chamber by a slidable separating piston. The space contains a compressible agent. The design of the shock absorber is such that when it is under load the damping fluid can be pressed out of one portion of the chamber, through the port, into the another portion. Similarly, when the load is removed, the damping fluid is returned to the first portion through the port.

In the issue of the U.S. journal "Machine Design" dated 24th May, 1962, there is described a series of hydraulically-operating shock absorbers with jet orifices which change under the load of impact. The idea of these shock absorbers is to obtain a reduction in the kinetic energy of the impact which is as uniform as possible along the length of the stroke. In these known shock absorbers, oil is used as hydraulic liquid. In this literature source, various types of jet orifices are described. These serve to convert part of the impact or kinetic energy into heat and at the same time compress a compressible damping medium.

Jet orifices whose diameter is varied by means of a metering pin are used as control parts in these apparatuses. Alternatively, control grooves of varying diameter in the inside wall of the cylinder, past which the piston is pushed are used. These known shock absorbers have the disadvantage, however, that for a given opening using oil as a hydraulic liquid (Newtonian fluid), only a very small buildup of damping force can be obtained over the length of the stroke or travel; if the jet orifice is too big, the oil does not undergo the necessary throttling effect and thus cannot build up the necessary pressure difference. Only with a correspondingly small jet orifice can a greater damping force be obtained. Moreover, with a large nozzle diameter and thus lower speeds, the proportion of laminar flow through the orifice is much greater. This results in there being a strong dependence of the oil hydraulic damping action on the temperature of the oil.

The known shock absorbers are therefore not universally applicable. They are only suitable for damping a very definite shock load which is always of the same magnitude, provided that the damper is constructed in accordance with the respective need.

U.S. Pat. No. 2,963,175 relates to a hydraulically-operating shock absorber for railway wagons which consists of a cylinder and a hollow piston rod supported slidably in the cylinder. In the base of the piston rod there is an opening through which a metering rod extends. The metering rod is fixed at one end to the bottom of the cylinder and has at the other end a conical disc positioned in the interior of the hollow piston rod so as to prevent the rod from slipping out of the cylinder. The conical disc also functions as a flow resistor for the hydraulic oil. A complicated system of gaskets and washers, guide rings and wiping rings, positioned in corresponding grooves in the outside circumference of the hollow piston rod or in the inside wall of the cylinder is provided as a sealing means. The known damper corresponds in principle to the one known from the literature source in "Machine Design" and thus has the same basic disadvantages which have already been listed for this type of damper.

DE-AS No. 2 324 402 relates to a hydraulically-operating shock absorber consisting of a cylinder closed at one end, a piston which is slidable within the cylinder having a port and being connected with a hollow piston rod that extends out of the open end of the cylinder, a chamber filled with a non-Newtonian damping fluid, and a space, separated from said chamber by a slidable separating piston, in which there is a compressible agent. The design of the shock absorber is such that when it is under load, the damping fluid can be pressed out of one portion the chamber through the port into another portion. Similarly, when the load is removed, the damping fluid is returned to the first portion through the port.

The control port in this reference consists of a groove of varying diameter in the inside wall of the cylinder past which the piston slides. When the shock absorber is under a shock load, the non-Newtonian fluid flows out of the cylinder chamber past a collar and a piston ring into a circular groove in the lateral surface of the piston. The fluid continues from there through an opening in the circular groove into the interior of the hollow piston. As a result of the fluid flowing into the interior the separating piston is displaced. This further compresses the pressure gas in the pressure area of the hollow piston rod.

This known damper has the disadvantage of being of a very complicated construction which contains a series of precision parts which are difficult to manufacture. Additionally, the control port is formed of parts which slide past one another and are thus subject to wear there is the danger that if the damper is under continuous load, the buildup of damping force will become less due to wear and tear on the parts. Further, erosion of the control groove in the inside wall of the cylinder will in time cause separation of the piston collar from contact with it, making the damper ineffective or causing it to jam. As a damping medium, a thixotropic fluid (grease) is used. The viscosity of thixotropic fluids decreases with increasing load time for a constant load or constant shearing speed. The damping force can therefore be determined only for a certain individual load and a defined load time. Different load times would unavoidably lead to different damping force development.

U.S. Pat. No. 3,489,087 relates to a hydraulically-operating shock absorber, having a cylinder closed at one end, a piston which is slidable within the cylinder with a piston rod extending out of the open end of the cylinder, a chamber filled with a non-Newtonian incompressible damping fluid, and a space separated from said chamber by a slidable separating piston, in which there is a compressible agent. The piston has a centrally positioned through opening for the incompressible damping fluid to pass through. In the hollow piston rod, the separating piston is biased by a spiral spring against the jet orifice 18 of the piston. The jet or nozzle is very thin and long, which means that there is at least a certain amount of friction caused by the fluid passing through the opening, and thus a certain conversion of the impact energy into heat. In this device a spiral spring is used as the compressible agent; and a "pseudo-plastic" liquid, namely a hydrocarbon emulsion, polymer solution or a so-called "Bingham" liquid is used as the incompressible damping medium. This material is not defined in more detail in the reference. Ideally, the damping force when plotted against displacement should show a hysteresis loop having a rectangular form. This is not possible with the known shock absorber.

The use of a quasi permanently plastic damping medium in a damper with a simple opening and a control pin is not only not rendered obvious by the U.S. Pat. No. 3,489,087, but is even excluded. It is expressly stated in column 2, lines 37 to 54, that hydraulically-operating dampers where a metering pin is moved back and forth in a jet are not suitable for damping shock loads over a wide range because the diameter of the metering pin is a function of its length and the respective design of the metering pin is very difficult. For every damping action there is a certain pin, which, since it cannot be linear, cannot be mechanically manufactured. One is advised against the use of dampers with metering or control pins guided by a throttle opening because of the constructional difficulties involved. The design of the hollow piston rod in the damper according to the present invention differs from the space in the hollow piston rod of this U.S. patent specification where a spiral spring is used as compressible means. The reference structure can have undesirable backspringing into the starting position or a position outside the starting position after the removal of the load.

DE-OS 2 438 180 relates to an impact damper or shock absorber filled with hydraulic oil for motor vehicles. The return stroke after the impact restrained in order to prevent subsequent damage to the vehicle. This special objective is obtained by a very special operational principle. In the cylinder which is closed at one end is a slidable piston. The piston is provided with an opening and moves in the outer cylinder with enough play to allow the oil in the cylinder chamber to flow past the piston into a circular chamber surrounding the piston. The circular chamber is sealed by a bushing of Teflon or nylon. The bushing serves to brake or restrain the impact and the return stroke. This ensues in that the bushing which under normal conditions lies free of tension in the part of the outer cylinder where the diameter is increased is pressed on the inward stroke (impact) into a circular groove of the inner cylinder.

In so doing, the elastic bushing functioning as a mechanical rubber spring takes up a large part of the impact energy. After the collision, i.e. on the return stroke to the starting position, the deformed bushing decelerates the return of the cylinder by friction.

OBJECT AND SUMMARY OF THE INVENTION

The present invention has as an object the design of a shock absorber having a damping force in the main working range as independent as possible of the stroke, being dependent instead on the initial speed of the piston; having, if possible, no parts endangered by wear and tear; enabling a high buildup of damping force even over different temperature ranges; having and being usable also as a load-dependent vibration damper (e.g. spring let).

The object is established in a hydraulically-operating shock and vibration damper of the nature referred to at the beginning, which is characterized in that the control port is a jet orifice formed by a through axial or peripheral opening in the piston and a control or metering pin of varying diameter which extends into the opening in the piston, and in that the damping fluid is a non-Newtonian, permanently plastic, homogeneous paste of graphite, 0,1 to 8% by weight wetting agent, 0,1 to 10% by weight polyglycol ether, polyglycol ester and/or a saturated aromatic or aliphatic ester of carboxylic acid, relative in each case to the total weight of the paste.

With the shock and vibration damper according to the invention, the most varied of damping operations can be executed in a very simple way without necessitating the use of complicated or correspondingly large dampers with high dimensional accuracy. Return of the damper to the starting position ensues likewise in a damped manner. As result of the combination or interaction of the measures described in claim 1, there is a uniform buildup of damping force in the main working range over the length of the stroke.

The damper is further characterized in that due to its simple construction, it is very unsusceptible to trouble, has a long working life, and can be used in any position. With corresponding appliction of, pressure to the gas space in the hollow piston rod, the shock absorber can be used as a load-dependent vibration damper, e.g. a spring leg or strut for a motor vehicle, the damping being adapted to the respective state of compression by means of the control pin projecting into the jet orifice. If, e.g. the vehicle is not loaded, the control pin does not sink as deeply into the jet orifice as in the case of a loaded vehicle. One thus obtains a damping force diagram or curve dependent on the respective load.

What is important in the case of the damper according to the invention is that with the incompressible damping fluid of high heat-conducting capacity, the damping force can be built up even when this fluid passes through very simple openings or bores. With normal damping oils this is only possible at high constructional expense. The damping fluid remains homogeneous also under high shearing loads, resulting in harmonious damping which is not possible with conventional damping liquids. A further advantage of the damper according to the invention is that small surface inaccuracies are filled by the damping medium, facilitating the movement of the sliding parts of the device.

With the damper according to the invention, an extremely high buildup of damping force can be obtained by the simplest of means. Flow speeds of 170 m/sec and more can be obtained in the throttle openings of the piston without the damping medium separating, becoming in-homogeneous, frothing, or decomposing.

The length of the cylinder is so designed that the piston can complete the entire stroke while at the same time the volume of damping fluid is taken up. If a slow return movement of the piston is desired, part of the space in the hollow piston rod is of greater cross section than the remaining part. In such a case, the separating piston is positioned in the enlarged part of the piston rod.

The piston rod is sealed off from the cylinder by means of a simple gasket ring.

The compressible agent in the space of the hollow piston rod is preferably atmospheric air under normal pressure or pressurized air. An additional mechanical spring element can be positioned in the space for improving the return movement and/or the dynamic outthrust of the damper. The mechanical spring element is preferably a spiral spring, a tapered cushioning spring, a rubber spring, an elastic block of pastic, or a rubber cuff.

In one embodiment of the damper according to the invention, the piston rod has a partially enlarged cross section on the side of the piston rod opposite the piston with the separating piston being positioned in the enlarged part of the piston rod.

The control pin is preferably of conical, parabolic or stepped configuration and is made of a firm, temperature-stable material, preferrably metal. The control pin can also consist of a pin with diameter decreasing towards the tip and may have at least one groove or flattened portion, e.g. a milled area, provided in the longitudinal direction (axial direction) on the pin. However, the control pin can also consist of a material which undergoes a change under the effect of a force, such as plastic or rubber. The control pin is preferably positioned at the separating piston or at the bottom surface of the cylinder; it can also be spring-mounted to the base of the cylinder.

In another preferred embodiment of the damper according to the invention, the control pin can also comprise at least one wedge positioned on the inside wall of the cylinder, past which the through opening in the periphery of the piston slides free of contact when the piston moves in or out. In this way the cross section of the opening is correspondingly enlarged or reduced. The cross section of the wedge increases downwards, so that the cross-sectional area of the opening becomes smaller when the piston is pushed in the case of a shock load. In this case it is preferable if the opening in the piston is in the form of a slot.

In another embodiment of the damper according to the invention, the opening in the piston has a cylindrical, parabolic, conical or stepped cylindrical cross section. The opening can be lined with a flexible or elastic material, for example, a plastic. The plastic used for the lining is preferably an elastomer.

In another embodiment of the damper according to the invention, the damping fluid contains a polyglycol ether and/or ester with a viscosity of about 10 mm$^2$/s to 1000 mm$^2$/s at 50° C., preferably of about 40 mm$^2$/s to 300 mm$^2$/s, the solidification point being between $-50°$ C. and $-0°$ C., especially $-40°$ C. to $-10°$ C. The relative average molar weight of the polyglycol ether and/or ester is about 700 to 2000, especially about 1100 to 3800, preferably about 1100 to 2300.

The mono- and/or di-ethers of polyethylene, polypropylene or polybutylene glycols have proved to be especially advantageous as polyglycol ethers. The ether group of the mono- or di-ethers can be a saturated, straight-chain or branched alkoxy group with 1 to 10 C atoms, especially 2 to 6 C atoms, in particular a polyethyleneglycol-mono-ethyl ether, propyl ether or butyl ether, polybutyleneglycol-mono-methyl ether, ethyl ether, propyl ether, butyl ether or pentyl ether.

Particularly suitable as polyglycol esters are the mono- and/or di-esters of polyethylene, polypropylene or polybutylene glycols, especially a monoester of polyethylene-, polypropylene- or polybutyleneglycol-mono-ether.

The polyglycol ethers, polyglycol esters and/or esters of carboxylic acid are preferably present in a quantity of about 59 to 60 wt. % relative to the total weight of the paste.

The homogeneous damping paste used in the dampers according to the invention preferably contains as an ester of carboxylic acid an ester of a saturated aliphatic alcohol with a saturated aliphatic $C_5$ to $C_{12}$ monocarboxylic acid or a saturated aliphatic dicarboxylic acid, dibenzolcarboxylic acid or tribenzol-carboxylic acid. Of the discarboxylic acids the $C_5$ to $C_{12}$-dicarboxylic acids are particularly preferred, especially phthalic acid, terephthalic acid and iso-phthalic acid. Especially suitable are also the esters of pentaerythrol, trimethylol propane and trimethylpropanol, and the esters of adipic acid, glutaric acid, pimelic acid, trimellitic acid, trimesic acid and/or hemimellitic acid.

As a wetting agent in the damping paste the following can be used: an amine salt of oleic acid, linoleic acid, palmitic acid or stearic acid, diamines of tallow fat acid and coconut oil acid, fluorinated alkyl polyoxyethylene ethanol, fluorinated potassium alkyl carboxylate and/or fluorinated alkyl ammonium iodide. The wetting agent is present in the paste especially in a quantity of 0.5 to 6 wt. % relative to the total weight of the paste.

The intrinsically viscous agent in the paste according to the invention comprises ground aluminium silicate or amorphous silicon dioxide, present in a quantity especially of 0.5 to 5 wt. % relative to the total weight of the paste. The bentonites are particularly suitable.

The paste used according to the invention can in addition also contain 0.1 to 3 wt. % of anti-oxidation agent, relative to the total weight of the paste. The anti-oxidation agent can preferably be sterically hindered alkyl phenols and/or thiophenols and/or dialkyl selenides. Particularly preferred as anti-oxidation agents are cresol compounds and bisphenol compounds such as di-tert.-butyl-p-cresol and methylene-4,4-(2,6-ditert.-)butylphenol.

Instead of the polyglycol ether, polyglycol ester or ester of carboxylic acid, the paste can contain a silicon oil with a viscosity of at least 20 mm$^2$/s at 25° C.

In order to prevent a vacuum being generated above the piston in the damper while under pressure load, the wall of the cylinder is preferably provided with an opening for equalization of the pressure.

In a still further of the damper according to the invention, the interior of the piston rod can be connected via at least one regulating valve with at least one pressure reservoir situated outside the damper for regulating the level.

The damper according to the invention is preferably a lift damper, an impact damper, a wheel damper or an engine damper.

The damper according to the invention will now be described in more detail with the help of the drawings. All the details or features emphasized in the description and the drawings can contribute to establishing the objective within the meaning of the invention, and have been included in the application with the desire to have them patented.

BRIEF DESCRIPTION OF THE INVENTION

FIG. 5b shows a partial lateral section of the control pin of FIG. 5a;

FIG. 7a shows a longitudinal section through a fifth embodiment; and

FIG. 7b shows a partial lateral section of the control pin of FIG. 7a.

DETAILED DESCRIPTION OF PREFERRED EMBODIMENTS

Figure 1:
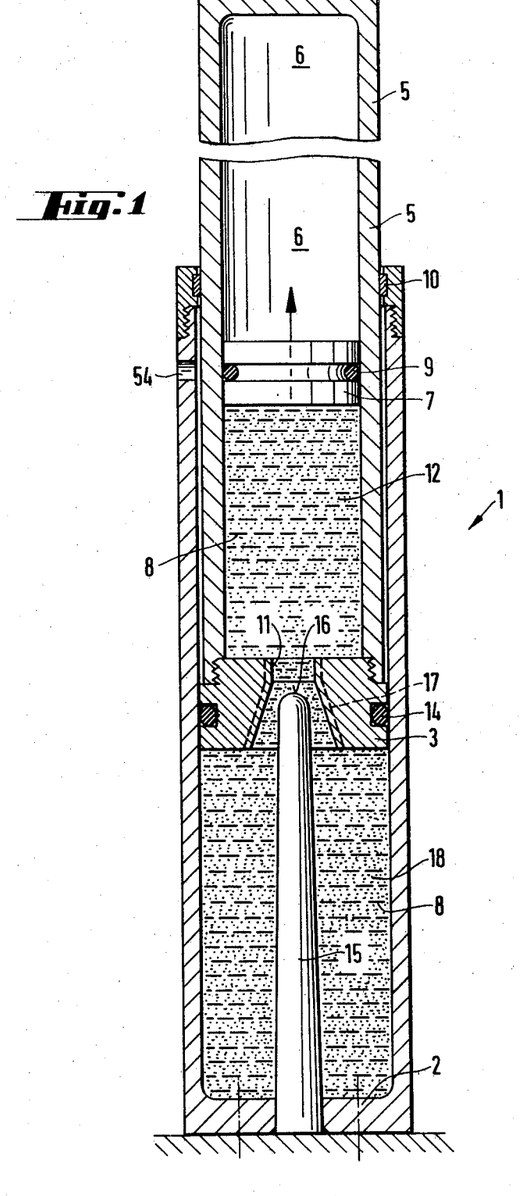
FIG. 1 shows a longitudinal section through a lift or impact damper according to the invention.
Figure 2:
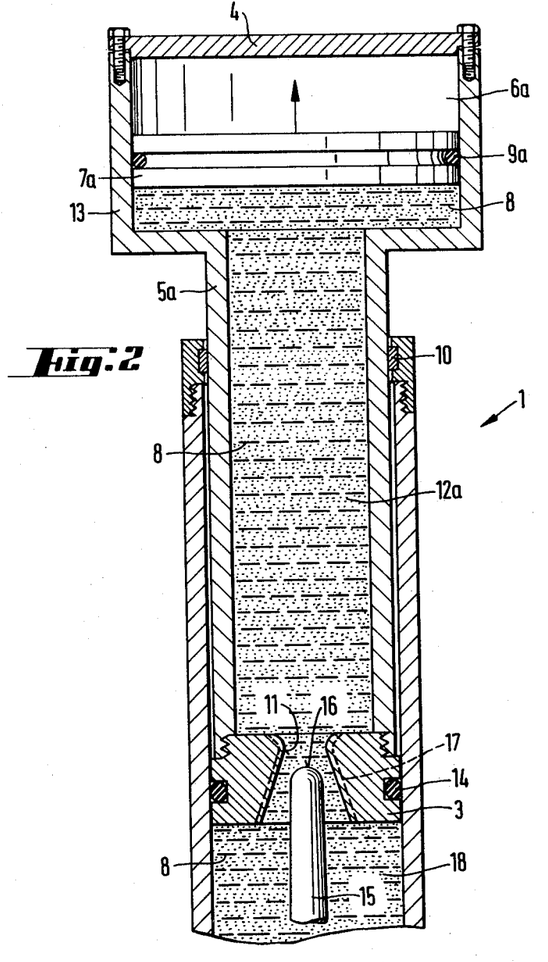
FIG. 2 shows a longitudinal section through the damper of FIG. 1 but with a partially enlarged piston rod cross section.

The dampers shown in FIGS. 1 and 2 can be used especially as lift dampers, impact dampers or vibration dampers. The base 2 of the cylinder 1 is fixed to the frame of the vehicle or to a firm constructional part. The closing plate 4 of the piston rod can be connected with a bumper (not shown) or can serve as a receiving surface for the impacting load. The piston 3 connected with the hollow piston rod 5 is guided slidably in cylinder 1. The piston rod 5 preferably has a somewhat smaller external diameter than the piston 3. In the space 6 of the piston rod 5 is a pressure gas which is separated from the incompressible damping fluid 8 by the separating piston 7. The latter has a ring 9, 9a to seal it off from the piston rod.

Despite its simple construction and normal cylinder size, the damper depicted in FIG. 1 is able to take up the energy of a medium-weight vehicle which drives against a stationary obstacle at a speed of up to 15 km/h. With oil pressure dampers, this would only be possible by using extremely expensive constructions. The predetermined pressure in the space 6 depends only on the desired restoring force. The space 6 can be filled with atmospheric air under normal pressure, if a particularly small restoring force of the piston is desired. To improve the guideways, the piston 3, the piston rod 5, and the cylinder 1 overlap in a relatively wide area when the damper is extended. The piston rod 5 is guided by means of a simple ring 10 on the inside wall of the cylinder 1. The piston 3 has at least one through opening 11. In the damper according to FIGS. 1 and 2, the opening 11 is disposed axially. It can, however, also be disposed at the preiphery of the piston 3. A gasket ring 14 seals the piston 3 from the inside wall of the cylinder. The piston rod 5 can be provided with a valve at the upper end if the space is to be acted on by different pressures. The damper can be mounted upright or lying down. The guiding and sealing of the piston is constructionally very simple to effect.

The damper of FIG. 2 differs constructionally from the example of FIG. 1 in that the piston rod 5a has a partially enlarged cross section 13 at the other end of the piston rod from the piston 3. In this case, the separating piston 7a is positioned in the enlarged cross sectional part of the piston rod and is guided by means of gasket ring 9a on the inside wall of the piston rod.

A conical control pin 15 is fixed in the middle of the base plate 2 of cylinder 1 in the chamber 18 filled with damping fluid. The control pin 15 can also be mounted on the base plate 2 by means of a spring. The tip 16 of the control pin 15 extends into the opening 11 of piston 3 when the damper is in its normal position. The control pin 16 can be made wholly or partially of metal, rubber, or plastic.

Figure 4:
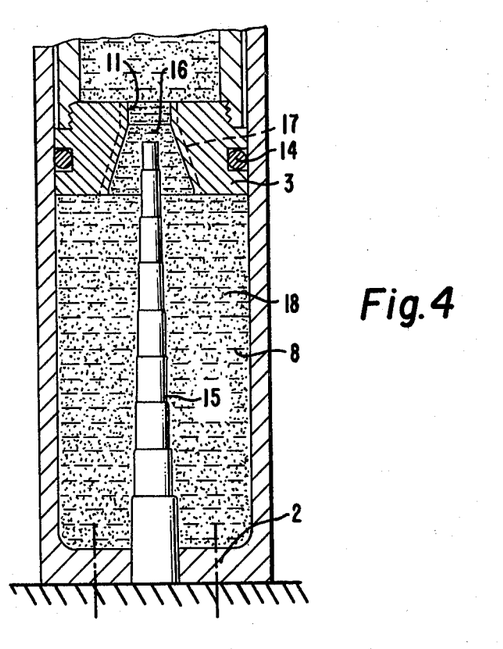
FIG. 4 shows a longitudinal section through a second embodiment of the present invention.
Figure 5A:
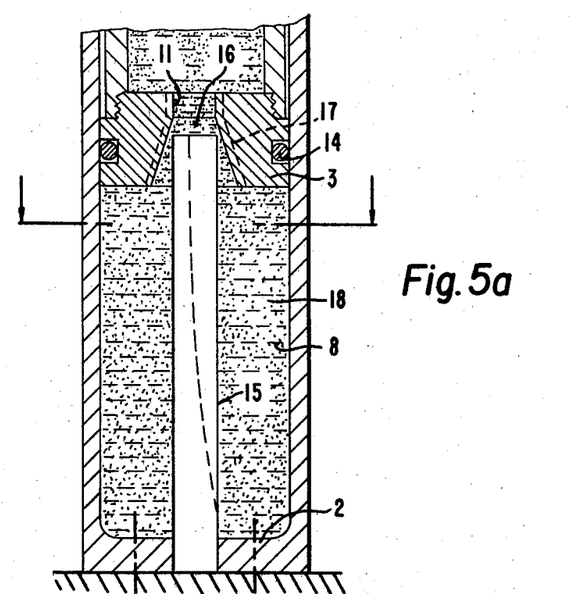
FIG. 5a shows a longitudinal section through a third embodiment.
Figure 5B:
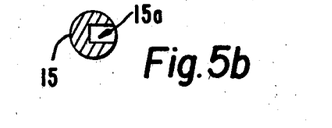
Figure 6:
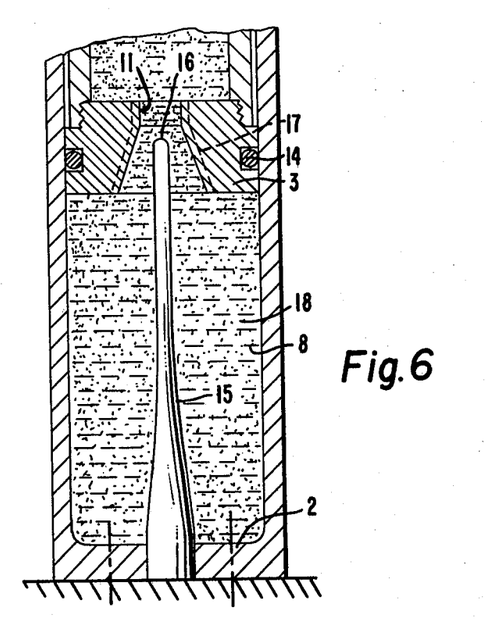
FIG. 6 shows a longitudinal section through a fourth embodiment.
Figures 7A, 7B:
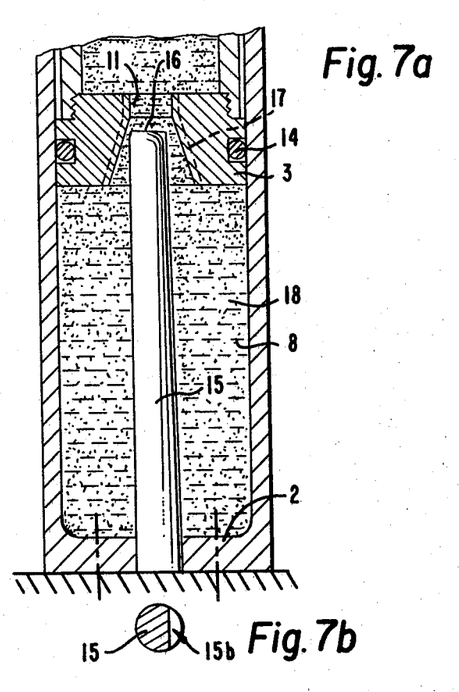

The control pin 15 can also be fixed to the separating piston 7, e.g. by means of a screw connection. The control pin can also be of a stepped configuration as shown in FIG. 4. The opening of the piston 3 can if necessary have an elastic lining 17 for controlling the damping. The lining can adapt automatically in this way to different force influences. The control pin 15 may have a diameter which decreases towards its tip as shown in FIG. 6 or may have at least one groove (shown in FIGS. 5a and 5b) or flattened portion (shown in FIG. 7a or 7b).

The region of the lining 17 is shown in dashed form in FIG. 1.

The control pin 15 operates dependent on the travel or length of stroke. When the piston 3 moves in the case of a load with its opening 11 over the pin 15, the opening's surface area for the passing through of fluid is reduced. The reduction in surface area compensates for the reduction in speed of the piston during the damping, so that over the course of the stroke the damping force is idealized.

When the damper is subjected to a load, the piston 3 moves into cylinder 1 and the incompressible, viscous damping fluid 8 of high heat-conducting capacity is pressed out of the cylinder chamber 18, through the opening 11, into the space 12, 12a of the hollow piston rod 5, 5a. This results in an axial displacement of the separating piston 7, 7a, consequently increasing the pressure in the space 6, 6a. On account of the larger pressure gas reservoir, the pressure in space 6a is increased less, which leads to a weaker restoring force, in other words, to a softer spring action. This is desirable e.g. in the case of lifts, safety-belt dampers and vehicles, in order to brake the effect of the acceleration gently on the body.

So as to prevent a vacuum being generated in the damper above the piston when there is a load, the cylinder wall has an opening 54 for equalizing the pressure.

The damping force $F_D$ is dependent on the rheology of the damping fluid, i.e. the speed with which the damping fluid flows through the opening 11, and adheres to the general formula:

$F_D = k \cdot v^n$ $F_D$ = damping force (N)
K = damping factor (N)/s.m
v = piston speed (m/s)
n = exponent of speed The factors k and n, which define the nature of the damping (progressive, linear, degressive) are dependent here on the shape of the opening 11 through which the damping fluid flows, the viscosity of the fluid, and the speed at which the fluid flows through.

The reaction power of the damper according to the invention is composed of the damping force resulting from the throttling of the fluid flow and the gas spring power accumulating in the air chamber or pressure gas chamber as a result of the increase in pressure. In the throttle opening most of the impact energy is converted into heat energy. The rest of the impact energy is stored by the gas spring formed by the compression of the gas in the space 6, 6a. After the impact, this energy taken up by the spring is likewise released again in throttled form due to the fluid being pressed back, as a result of the the spring power, out of the space 12, via the opening 11, and into the cylinder chamber 18. At the same time the piston rod connected with the piston 3 returns to its starting position. As a result of the combination of the cross section of the opening and the simultaneous pressure buildup of the gas spring, a speed-dependent control of the damping is thus obtained.

Figure 3:
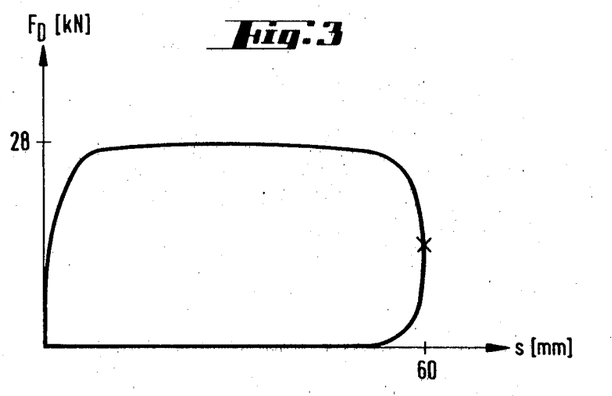
FIG. 3 shows a damping force/travel diagram of the damper according to FIG. 1.

FIG. 3 shows the damping force/travel diagram for the damper of FIG. 1. The load was 500 kg, the damping force $F_D28kN$, the total stroke or travel 60 mm and the speed $v_o=2.3$ m/sec. Due to the fact that the pass-through surface area between piston opening 11 and control pin 15 is larger at the beginning of the shock load, the buildup of damping force is gentler at the beginning, i.e. the characteristic curve does not rise so steeply. The speed of impact is then delayed along the linear to zero, and at the end of the stroke the damping force decreases slightly. Return of the piston rod ensues as from the point marked x. Despite the larger pass-through opening, the damping is idealized or linearized by the control pin 15, which penetrates into the piston opening during the damping. As the characteristic line shows, the return movement is also idealized due to the sliding out of control pin 15; i.e. the line characterizing the damping is quasi rectangular.

I claim:

1. Hydraulically-operated shock and vibration damper which includes a cylinder closed at one end having an interior, a piston which is slideable within the cylinder, said piston being provided with a control port and connected with a hollow piston rod having an interior and extending out of the open of the cylinder, a chamber defined by said interior of said cylinder, and the interior of the hollow piston rod filled with an incompressible damping fluid, and a slideable separating piston in said hollow piston rod defining a space separate from said chamber in which there is a compressible agent, the damping fluid being pressable out of one portion of the chamber, via the control port, another portion of the chamber bounded by the separating piston and compressing the space there behind when the shock absorber is under load, characterized in that the control port consists of a simple jet orifice formed by a through axial opening (11) in the piston (3) and a control pin (15) of varying diameter which extends into the opening of the piston, and in that the damping fluid is non-Newtonian, permanently plastic, homogeneous paste (8) of graphite, 0.1 to 8 wt. % wetting agent, 0.1 to 10 wt. % structural viscosity agent and 40 to 70 wt. % of a fluid selected from the group consisting of polyglycol ether, polyglycol ester, a saturated aromatic ester of carboxylic acid, and a saturated aliphatic ester of carboxylic acid, relative to the total weight of the paste (8).

2. Damper according to claim 1, characterized in that the compressible agent in the space (6) of the hollow piston rod is atmospheric air under normal pressure.

3. Damper according to any one of claims 1 to 2, characterized in that the piston rod (5a) has a partially enlarged cross section (13) at the other end of the piston rod from the piston (3), the separating piston (7a) being positioned in the enlarged part of the piston rod.

4. Damper according to one of claims 1 to 2, characterized in that the control pin (15) is of conical configuration and comprises a firm, temperature-stable metal.

5. Damper according to one of claims 1 to 2, characterized in that the control pin has a cross section which decreases towards the tip.

6. Damper according to one of claims 1 to 2 characterized in that the control pin (15) is positioned at the base (2) of the cylinder.

7. Damper according to one of claims 1 to 2 characterized in that the opening (11) in the piston (3) has a conical cross section and the opening (11) is lined with an elastic material (17).

8. Damper according to any one of claims 1 to 2, characterized in that the fluid is selected from the sub-group consisting of polyglycol ether and polyglycol ester having a viscosity of about 10 $mm^2/s$ to 1000 $mm^2/s$ at 50° C., a solidification point between $-50°$ C. and $-0°$ C., and a relative, average molar weight of about 700 to 20000.

9. Damper according to claim 8, characterized in that the fluid has a viscosity of about 40 $mm^2/s$ to 300 $mm^2/s$ at 50° C., a solidification point between $-40°$ C. and $-10°$ C., and a relative, average molecular weight of about 1100-2300.

10. Damper according to any one of claims 1 to 2, characterized in that the fluid is polyglycol ether selected from the group consisting of a polyethyleneglycol-mono-ethyl ether, propyl ether or butyl ether, polybutyleneglycol-mono-methyl ether, ethyl ether, propyl ether, butyl ether or pentyl ether.

11. Damper according to any one of claims 1 to 2, characterized in that the fluid is polyglycol ester selected from the group consisting of mono-esters of polyethylene, polypropylene and polybutyleneglycol-mono-ethers.

12. Damper according to any one of claims 1 to 2, characterized in that the fluid is present in a quantity of about 50 to 60 wt. % relative to the total weight of the paste (8).

13. Damper according to any one of claims 1 to 2, characterized in that the fluid is a carboxylic acid ester selected from the group consisting of esters of a saturated aliphatic alcohol with one of a saturated aliphatic $C_5$ to $C_{12}$-monocarboxylic acid, a saturated aliphatic dicarboxylic acid, dibenzol-carboxylic acid or tribenzolcarboxylic acid.

14. Damper according to any one of claims 1 to 2, characterized in that the wetting agent is selected from the group consisting of an amine salt of oleic acid, linoleic acid, palmitic acid or stearic acid, the diamines of tallow fat acid or coconut oil acid, fluronated alkyl polyoxyethylene ethanol, fluorinated potassium alkyl carboxylate and/or fluorinated alkyl ammonium iodide.

15. Damper according to any one of claims 1 to 2, characterized in that the structural viscosity agent is ground aluminum silicate being present in a quantity of about 0.5 to about 5 wt. % in the paste.

16. Damper according to one of claims 1 to 2, characterized in that the control pin (15) is of parabolic configuration.

17. Damper according to one of claims 1 to 2, characterized in that the control pin (15) is of stepped configuration having successively smaller diameter portions extending away from the base of the cylinder.

18. Damper according to one of claims 1 to 2, characterized in that the control pin (15) comprises a material which undergoes a change under the inluence of force.

19. Damper according to one of claims 1 to 2, characterized in that the control pin (15) has at least one groove therein sunk in axial direction in the surface of the pin.

20. Damper according to one of claims 1 to 2, characterized in that the control pin (15) has flattened portion extending longitudinally thereof.

* * * * *